(12) United States Patent
Duchene et al.

(10) Patent No.: US 10,233,892 B2
(45) Date of Patent: Mar. 19, 2019

(54) HYDROKINETIC ROTOR AND DEVICE INCLUDING SUCH A ROTOR

(71) Applicant: GE Energy Power Conversion Technology Ltd, Warwickshire (GB)

(72) Inventors: Hugo Duchene, Nancy (FR); Philippe Cagnin, Champigneulles (FR); Antoine Girard-Pecarrere, La Rochelle (FR)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 982 days.

(21) Appl. No.: 14/374,673

(22) PCT Filed: Jan. 24, 2013

(86) PCT No.: PCT/EP2013/051359
§ 371 (c)(1),
(2) Date: Feb. 13, 2015

(87) PCT Pub. No.: WO2013/110715
PCT Pub. Date: Aug. 1, 2013

(65) Prior Publication Data
US 2015/0226174 A1    Aug. 13, 2015

(30) Foreign Application Priority Data

Jan. 27, 2012  (FR) ..................... 12 50817

(51) Int. Cl.
*F03B 13/26* (2006.01)
*F03B 3/14* (2006.01)
*F03B 3/12* (2006.01)

(52) U.S. Cl.
CPC .............. *F03B 3/145* (2013.01); *F03B 3/121* (2013.01); *F03B 3/14* (2013.01); *F03B 13/264* (2013.01);
(Continued)

(58) Field of Classification Search
CPC ........ F03B 13/264; F03B 17/061; F03B 3/04; F03B 3/121; F03B 3/123; F03B 3/126;
(Continued)

(56) References Cited

U.S. PATENT DOCUMENTS 4,180,367 A * 12/1979 Drees ...................... F03D 3/002
                                                              416/119
4,515,511 A *  5/1985 Heerlein ................. F04D 29/36
                                                              416/131
(Continued)

FOREIGN PATENT DOCUMENTS

CN          1036248 A   10/1989
CN       101532460 A    9/2009
(Continued)

OTHER PUBLICATIONS

Unofficial English Translation of Chinese Office Action issued in connection with corresponding CN Application No. 201380016061.0 dated Feb. 29, 2016.
(Continued)

*Primary Examiner* — Seth W. Mackay-Smith
(74) *Attorney, Agent, or Firm* — GE Global Patent Operation; Scott R. Stanley

(57) ABSTRACT

This hydrokinetic rotor is arranged to be rotated by a flow of a liquid. This rotor comprises of an inner ring, an outer ring and at least one blade extending between the inner ring and the outer ring in a radial direction (R), the inner rings and the external rings being centered on a same longitudinal axis (X).
This rotor comprises of at least one radial axis extending radially between the inner ring and the outer ring, and at least one blade is movable around the respective radial axis. The rotor comprises of the limitation means of the move-
(Continued)

ment in rotation of at least one blade mentioned above around its respective radial axis.

7 Claims, 4 Drawing Sheets

(52) U.S. Cl.
CPC ......... *F05B 2240/97* (2013.01); *Y02E 10/223* (2013.01); *Y02E 10/28* (2013.01)

(58) Field of Classification Search
CPC ........ F03B 3/14; F03B 3/145; F05B 2220/32; F05B 2240/97; Y02E 10/223
USPC .......................................... 416/107, 140, 205
See application file for complete search history.

(56) References Cited

U.S. PATENT DOCUMENTS

| | | | | |
|---|---|---|---|---|
| 7,258,527 | B2* | 8/2007 | Shih | ............ B63H 7/00 415/4.2 |
| 8,678,745 | B2* | 3/2014 | Arlitt | ............ F03B 13/14 415/3.1 |
| 2003/0235498 | A1* | 12/2003 | Boatner | ............ F03D 3/067 416/119 |
| 2005/0271508 | A1* | 12/2005 | Beyene | ............ F01D 1/30 416/132 A |
| 2008/0304968 | A1* | 12/2008 | Fite | ............ F03B 17/065 416/140 |
| 2011/0142625 | A1* | 6/2011 | Mowat | ............ F03B 17/067 416/1 |
| 2011/0272945 | A1* | 11/2011 | Ortiz | ............ F03B 3/14 290/53 |

FOREIGN PATENT DOCUMENTS

| | | |
|---|---|---|
| CN | 101798983 A | 8/2010 |
| DE | 102008007616 A1 | 8/2009 |
| DE | 102010011708 A1 | 9/2011 |
| GB | 2435908 A | 9/2007 |
| JP | 2005188494 A | 7/2005 |
| KR | 20100133532 A | 12/2010 |
| KR | 20110017996 A | 2/2011 |
| WO | 2011113424 A2 | 9/2011 |

OTHER PUBLICATIONS

Unofficial English Translation of PCT Search Report and Written Opinion issued in connection with corresponding PCT Application No. PCT/EP2013/051359 dated Aug. 13, 2013.
Unofficial English Translation of European Search Report issued in connection with corresponding EP Application No. 13152541 dated Aug. 12, 2013.

* cited by examiner

HYDROKINETIC ROTOR AND DEVICE INCLUDING SUCH A ROTOR

FIELD OF THE INVENTION

The present invention relates to a hydrokinetic rotor, the rotor being adapted to be rotated by a flow of a liquid, the rotor comprising of an inner ring, an outer ring and at least one blade extending between the inner ring and the outer ring in a radial direction, the inner and outer rings being centered on the same longitudinal axis.

The invention also relates to hydrokinetic device comprising a stator and such rotor.

BACKGROUND

Hydrokinetic rotor of the above type is known. The blades of such a rotor are mechanically united from the inner ring and the outer ring, and then make a mechanical connection between the inner ring and the outer ring. The rotor is rotatable about a longitudinal axis corresponding substantially to the flow direction. All blades are positioned with substantially the same inclination relative to a plane perpendicular to the longitudinal axis. The inclination of the blades is a predetermined value.

However, the performance of a hydrokinetic device comprising of such a rotor is not optimal in the entire speed range of the rotor, the speed range being for example between 0 and 50 revolutions/minute.

BRIEF SUMMARY

The object of the invention is therefore to provide a hydrokinetic rotor offering better performance over the whole range of rotational speeds, such as rotor speeds between 0 and 50 revolutions/minute.

For this, the invention relates to a hydrokinetic rotor of the type that has been mentioned above, characterized in such that it comprises of at least one radial axis extending radially between the inner ring and the outer ring, such that at least one blade is rotatable around a respective radial axis, and that the rotor comprises of the means for limiting the rotational movement of the aforementioned at least one blade around its respective radial axis.

According to other advantageous aspects of the invention, the rotor comprises of one or more of the following characteristics, taken in isolation or any technically possible combination:

- Limiting means comprise, for at least one blade, of at least a stop arranged on at least one ring from the inner ring and the outer ring,
- Limiting means comprising, for at least one blade, of a first stop and a second stop arranged on at least one ring from the inner ring and the outer ring, the first stop being associated with a first direction of the current through the rotor and the second stop being associated with a second direction of the current with respect to the rotor,
- the limiting means comprising, for at least one blade, of an upper stop provided on the outer ring and a lower stop provided on the inner ring,
- Limiting means comprising, for at least one blade, of a first upper stop and a second upper stop arranged on the outer ring, and a first lower stop and a second lower stop arranged on the inner ring, the first stops being associated with the first direction of the current and second stops being associated with the second direction of the current,
- the limitation means comprising, for at least one of the blades, of an upper stop provided on the outer ring, the blade has a rest position in the absence of current, and the value of the angle between the rest position and a stop position of the blade against the upper stop is between 10 degrees and 30 degrees, preferably equal to 20 degrees,
- the limitation means comprising, for at least one of the blades, of a lower/bottom stop provided on the inner ring, the blade has a rest position in the absence of current, and the value of the angle between the rest position and a stop position of the blade against the lower stop is between 30 degrees and 60 degrees, preferably equal to 45 degrees,
- the rotor comprises, for each blade, of a radial axis extending radially between the inner ring and the outer ring, each blade is rotatable around its respective radial axis, and the limiting means are adapted to limit the rotational movement of each blade,
- the rotor comprises of a plurality of blades, the number N of blades preferably being between 2 and 20, preferably equal to 8, and
- The blade or each blade has an upper surface, a lower surface, a leading edge and a trailing edge, the leading edge being the edge of the blade extending in the radial direction and disposed upstream in the direction of the liquid flow along the trailing edge blade being the edge opposite to the leading edge and disposed downstream in the direction of flow of liquid along the blade,
- wherein at least one portion of at least one blade has a cross section as per the plane perpendicular to the radial direction, a profile having a thick portion and a thin portion, the thick portion and thin portion each having a maximum thickness according a direction perpendicular to the upper surface, the maximum thickness of the thick portion is at least four times the maximum thickness of the thin portion, and
- Wherein the curvilinear length of the thin part is 0.1 times the length of the chord between the leading edge and the trailing edge and 0.9 times the length of said chord, preferably between 0.25 times the length of said chord and 0.9 times the length of said chord.

The invention also relates to a hydrokinetic device comprising of a rotor and a stator, characterized in such that the rotor is as defined above.

BRIEF DESCRIPTION OF THE DRAWINGS

These features and advantages of the invention appear on reading the description which follows, given purely by way of non-limiting example, and with reference to the accompanying drawings in which.

DETAILED DESCRIPTION

Figure 1:
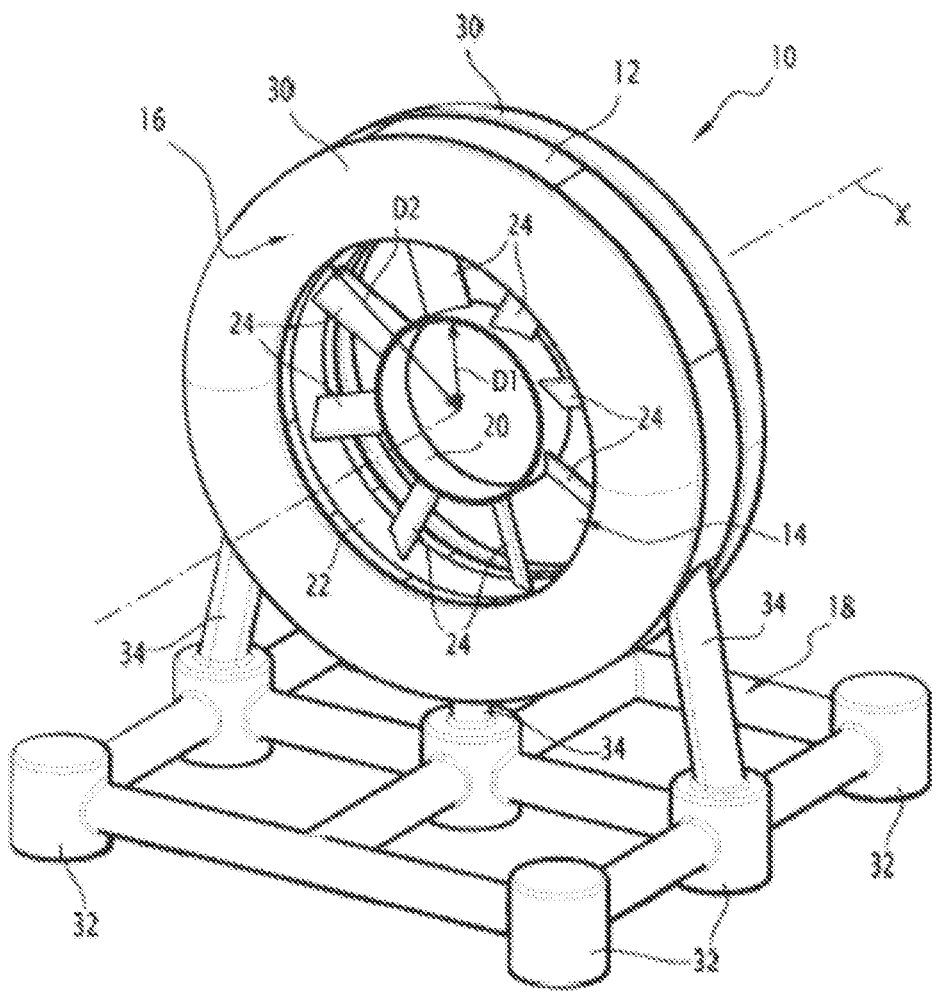
FIG. 1 is a perspective view of hydrokinetic device according to the invention.

In FIG. 1, a hydrokinetic device 10 comprises of a stator 12, a rotor 14 rotating about a longitudinal axis X, and a nozzle 16. The Hydroelectric 10 also comprises of a support 18 for holding the stator.

The hydrokinetic device 10 is adapted to transform the kinetic energy of a flowing stream of a liquid inside the nozzle 16 in the longitudinal direction X into electric energy, the current causing the rotor 14 to rotate about the longitudinal axis X, and the rotation of the rotor 14 relative to stator 12 that generates electrical energy.

The hydrokinetic device 10 is, for example, an underwater tidal turbine for utilizing the kinetic energy of the ocean currents. Alternatively, the tidal is intended to be submerged in a stream, in order to convert the hydraulic energy of the stream into electric energy.

The stator 12 is in the form of a revolution ring around the longitudinal axis X. The stator 12 comprises, as known per se, of active magnetic stator, not shown.

The rotor 14 comprises of an inner ring 20, an outer ring 22 and a plurality of blades 24 extending in a radial direction R perpendicular to the longitudinal axis X, between the inner ring 20 and outer ring 22. The number N of blades (24) is preferably between 2 and 20.

In the execution example of FIG. 1, the rotor 14 has eight blades angularly distributed around the outer periphery of the inner ring 20, and N is equal to 8. This means that the angular difference between two successive blades is substantially equal to 45°.

Figure 2:
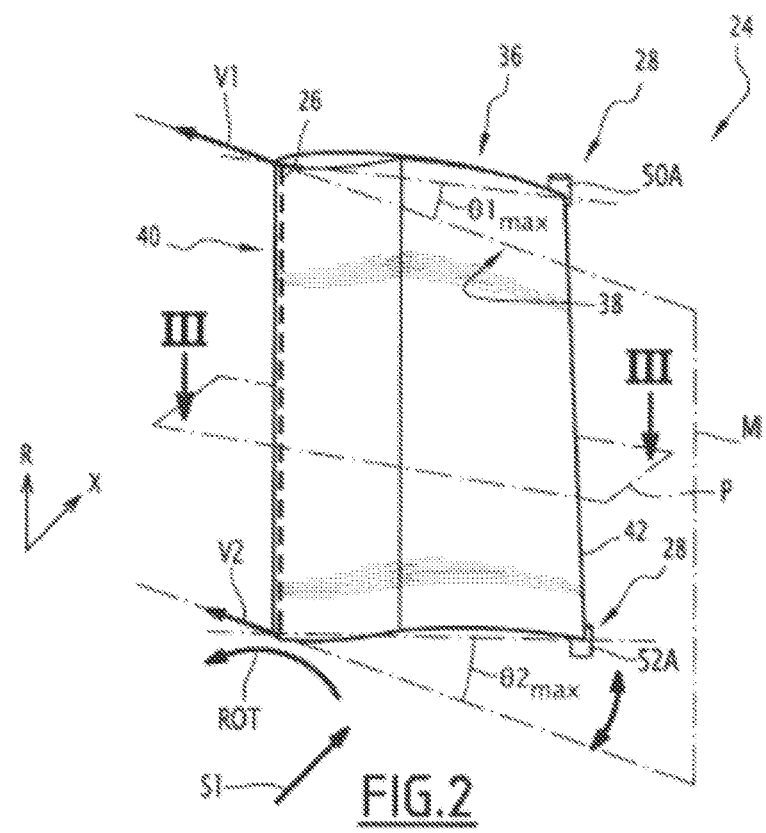
FIG. 2 is a schematic view of a hydrokinetic blade of FIG. 1.

The rotor 14 comprises of at least one radial axis 26, shown in FIG. 2, extending radially between the inner ring 20 and outer ring 22, and at least one blade 24 is rotatable around a radial axis 26 respectively. The rotor 14 further comprises of means 28 for limiting the rotational movement of the aforementioned of at least one blade 24 around the respective radial axis 26, as shown in FIG. 2.

In the embodiment described, the rotor 14 comprises, for each blade 24, of a respective radial axis 26 extending radially between the inner ring 20 and outer ring 22, and each blade 24 is rotatable around its radial axis 26, In other words, the rotor 14 includes N radial axis 26.

In the variant that is not shown, the rotor 14 comprises of only one or more blades 24, also called mobile blades, a respective radial axis 26 extending radially between the inner ring 20 and outer ring 22. Each mobile blade is then adopted to rotate around its radial axis 26, the other blades 24, also called fixed blades, are mechanically secured to the inner rings 20 and/or external rings 22 according to a predetermined inclination angle with the plane perpendicular to the longitudinal axis X.

The rotor 14 also includes active magnetic rotor parts, not shown, arranged on the outer periphery of the outer ring 22 and adapted to cooperate with the magnetically active stator parts, in order to generate a magnetic field upon rotation of the rotor 14 around the longitudinal axis X and inside the stator 12.

The nozzle 16 comprises of two half-nozzles 30 fixed on either side of the stator 12 in the longitudinal direction X, as shown in FIG. 1. The nozzle 16 is in the shape of a torus of revolution around the longitudinal axis X, the torus having a cross section of oblong shape. Each half nozzle 30 has, in following section as per the longitudinal plane parallel to the longitudinal axis X, a U-shape, both ends of the U being fixed to the stator 12.

The holding support 18 comprises of several support pads 32 on the ground and three vertical arms 34 for holding the stator away from the ground. The holding support 18 comprises, for example, of a tubular frame.

The inner ring 20 and outer ring 22 are each in the form of a cylindrical tube of revolution around the longitudinal axis X. The inner ring 20 and the outer ring 22 are centered on the longitudinal axis X. The length of the inner ring 20 and the length of the outer ring 22 along the longitudinal direction X are substantially equal, as shown in FIG. 1. Alternatively, the length of the inner ring 20 and the length of the outer ring 22 in the longitudinal direction X are different.

The inner ring 20 has a first diameter D1 in the plane perpendicular to the longitudinal axis X, and the outer ring 22 has a second diameter D2 greater than the first diameter value D1. The value of the first diameter D1 is, for example, between 2000 mm and 8000 mm. The value of the second diameter D2 is, for example, between 4000 mm and 18 000 mm.

Figure 4:
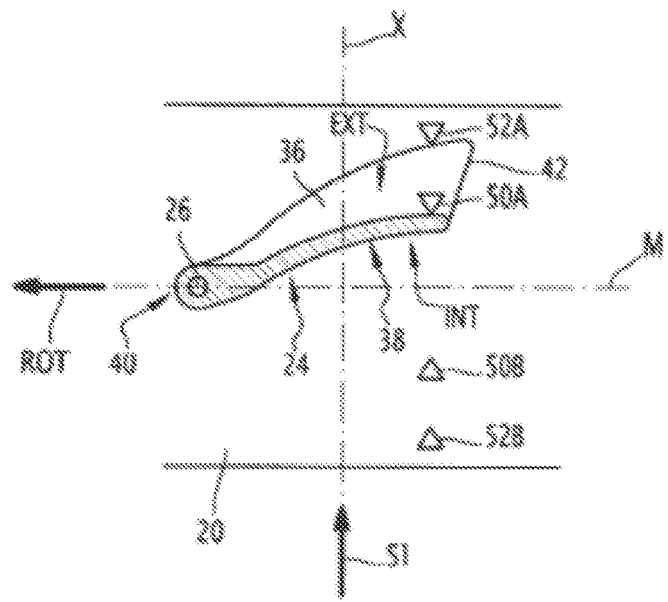
FIG. 4 and FIG. 5 respectively, are top views of the blade of FIG. 2 following the first direction of the current along a longitudinal direction, following a second direction of the current respectively opposite to the first direction of the current, according to a first embodiment of the invention.
Figure 5:
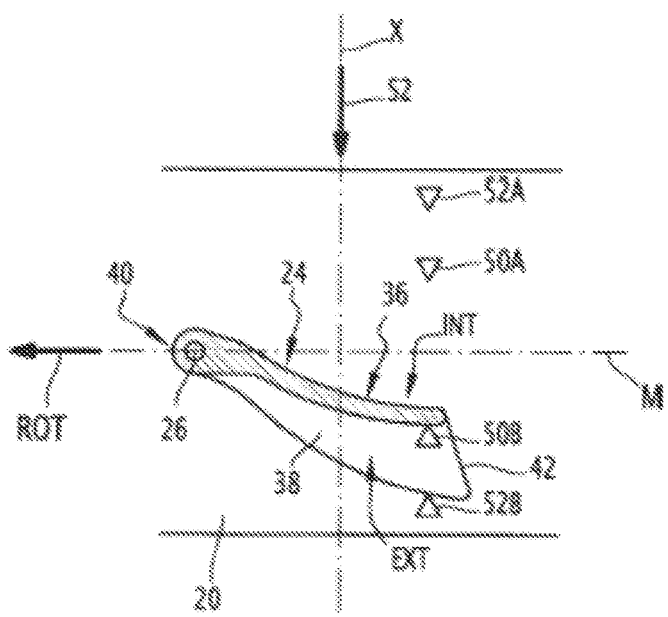

Each blade 24 has a first side 36, a second side 38, a leading edge 40 and a trailing edge 42, as shown in FIG. 2. According to a first direction S1 of the water flow along the longitudinal direction X, the first side 36 corresponds to the suction EXT and the second side 38 corresponds to the underside INT, INT is the lower surface of the blade 24 subjected to the pressure of the water stream and the extrados EXT is the side of the blade 24 on the side opposite the pressure underside INT, as shown in FIG. 4. According to the second direction of the current S2, opposite to the first direct S1 the first side 36 corresponds to the underside INT and the second side 38 corresponds to the suction EXT, as shown in FIG. 5. The leading edge 40 is the edge of the blade 24 extending in the radial direction R and disposed upstream in the direction of the water flow along the blade 24. The trailing edge 42 is the edge of the blade 24 opposite to the leading edge 40 and disposed downstream in the direction of the water flow. In other words, the leading edge 40 facing the flow of water, and the trailing edge 42 is the rear portion of the blade 24 in the direction of the water flow.

At least a portion of the blade 24 in the radial direction R has, in cross section according to the sectional plane P perpendicular to the radial direction R, a profile 44 having a thick portion 46 and a thin portion 48.

Alternatively, the blade 24 has, in cross section according to the sectional plane P, a profile with only the thick portion 46.

Alternatively, the blade 24 has, in cross section according to the cutting plane P, a profile with only the thin portion 48.

Alternatively, the blade 24 has a cross section along the section plane P, a rectangular profile, since the blade 24 is in the form of a cuboid. In other words, the blade 24 is substantially plane.

The radial axis 26 is united with at least one ring from the inner ring 20 and outer ring 22. In the execution examples of FIGS. 1 and 2, the radial axis 26 is solid with the inner ring 20 and outer ring 22, one end of the radial axis 26 being fixed to the inner ring 20 and the other end being attached to outer ring 22. Each end of the radial axis 26 is fixed substantially in the middle of the correspondent ring 20, 22 according to the longitudinal direction X.

Alternatively, the radial axis 26 is integral with the blade 24, and is rotatable relative to the inner ring 20 and outer ring 22, The radial axis 26 is made, for example, of a rod-shaped steel, or aluminum, or composite material.

Alternatively, the radial axis 26 is in the form of protrusions fixed to the blade 24 and at the end with respect to the blade 24, they are received within corresponding receiving apertures, formed in the inner ring 20 and outer ring 22. The projections forming the radial axis 26 are, for example, integrally formed with the blade 24.

The limiting means 28 comprises for each rotating moving blade 24 around a corresponding radial axis 26, of at least one stop 50A, 50B, 52A, 52B arranged on at least one ring from the inner ring 20 and the outer ring 22.

In the execution example of FIGS. 2, 4 and 5, the limiting means 28 comprise, for every rotational moving blade 24 around a corresponding radial axis 26, first upper stop 50A and a second stop 50B arranged on outer ring 22, and a first bottom stop 52A and a second bottom stop 52B arranged on the inner ring 20. In other words, the limiting means 28 comprises of N first upper stops 50A and N second upper stops 50B arranged on the outer ring 22, as well as N first lower stops 52A and N second stops 52B arranged on the lower inner ring 20.

In variant that is not shown, the limiting means 28 comprises of a stop pin extending substantially in the radial direction R and forming a stop over the entire height of the blade 24 in the radial direction R.

In another variant, the limiting means 28 comprises of retaining springs for retaining the blade 24 near the trailing edge 42.

In another variant, the limiting means 28 comprises of torsion springs for holding the blade 24 adjacent to the leading edge 40.

Figure 3:
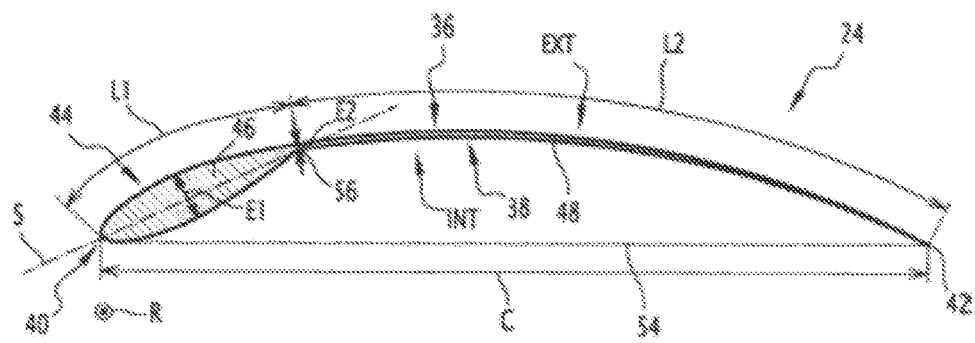
FIG. 3 is a sectional view along the plane III of FIG. 2.

The leading edge 40 and trailing edge 42 are connected by an imaginary segment 54, shown in dotted lines on the FIG. 3, also called rope between the leading edge 40 and the trailing edge 42.

The profile 44 has an inflection point 56 on the side of the underside INT.

The thick portion 46 has a first maximum thickness E1 in a direction perpendicular to the extrados EXT, and has a first curved length L1 of the upper side of the EXT, as shown in FIG. 3.

The thick portion 46 has a plane of symmetry S, visible in FIG. 3, the plane of symmetry S parallel to the radial direction R. The thick portion 46 is, for example, made of a metallic material, such as the aluminum.

The thin portion 48 has a second maximum thickness E2 in a direction perpendicular to the extrados EXT, and has a second curved length L2 of the upper side EXT. The thin portion 48 is, for example, made of a composite material or sheet metal, or polyetheretherketone, also known as PEEK (PolyEtherEtherKetone in English).

Alternatively, the thick portion 46 and thin portion 48 are made of a thermoplastic or thermosetting material. Alternatively, the thick portion 46 is made of a composite material.

The rope 54 between the leading edge and the trailing edge has a length C.

The inflection point 56 corresponds approximately to the boundary between the thick part 46 and the thin part 48.

The second curvilinear length L2 is 0.1 times the length of the rope 54 C between the leading edge and the trailing edge and 0.9 times the length C of the aforementioned chord 54. The second chord length L2 is curvilinear preferably between 0.25 times the length C and 0.9 times the length C.

The first maximum thickness E1 is at least four times greater than the second maximum thickness E2. The first maximum thickness E1 is less than or equal to 0.25 times the length of the cord C between the leading edge 40 and the trailing edge 42.

In the execution example of FIG. 2, the entire blade 24 has the thick portion 46 and thin portion 48 regardless of the position of the cutting plane P along the radial direction R. The blade 24 has, for example, the same profile 44 regardless of the position of the cutting plane P in the radial direction R.

In variant that is not shown, the length C of the rope 54 between the leading edge 40 and trailing edge 42 is of variable value depending on the position in the radial direction R of the cutting plane P. In other words, the profile 44 is variable in shape depending on the position of the cutting plane P along the radial direction R.

The first upper stop 50A and the second upper stop 50B are secured to the outer ring 22.

The first upper stop 50A and the second upper stop 50B are arranged substantially symmetrically to a median plane M of the outer ring perpendicular to the longitudinal axis X, as shown in FIGS. 4 and 5, where the outer ring 22 is not shown for clarity of the drawing.

The first lower stop 52A and the second lower stop 52B are secured to the inner ring 20 and are disposed substantially symmetrical to the median plane M.

The first stops 50A, 52A are associated with the first direction of the current S1, as shown in FIG. 4, and the second stops 50B, 52B are associated with the second direction of the current S2, as shown in FIG. 5.

The first and second upper stops 50A, 50B are positioned such that the maximum value of a top angle θ1max between a rest position of the blade 24 in the absence of current and the stop position of the blade 24 against the upper stop 50A, 50B respectively is between 10° and 30°, preferably equal to 20°.

The value of the angle between a stop position of the blade 24 against the first upper stop 50A and a stop position of the blade against second upper blade 50B is between 20 and 60°, preferably equal to 40°, the first and second upper stops 50A, 50B being substantially symmetrical to each other with respect to the median plane M, and the rest position of the blade 24 being substantially coincident with the median plane M.

The first and second lower stops 52A, 52B are positioned such that the maximum value θ2max between a rest position and a stop position of the blade against the lower stop 52A, 52B respective is between 30° and 60°, preferably equal to 45°.

The value of the angle between the stop position of the blade 24 against the first lower stop 52A and a stop position of the blade 24 against the second lower stop 52B is between 60° and 120°, preferably equal to 90°, the first and second lower stops 52A, 52B being substantially symmetrical to each other with respect to the median plane M.

The value of the maximum top angle θ1max is selected as less than the value of the maximum low angle θ2max since the high tangential speed of blade (arrow V1) is greater than the tangential velocity at the bottom of blade (arrow V2) angle as shown in FIG. 2.

The functioning of the hydrokinetic device 10 according to the invention will now be explained with the help of FIGS. 4 and 5.

In the absence of water flow and when the rotor 14 is stopped, no flow of water is flowing along the blade 24. The blade 24 is in a rest position, the leading edges 40 and the trailing edge 42 being arranged substantially in the median plane M.

When the hydrokinetic device 10 is placed in a stream of water, the blade 24 spins strongly under the effect of the current until it stops against the first upper stop 50A and lower stop 52A when power is in the first direction S1 as shown in FIG. 4. The support of the current on the blades 24 then causes the rotor 14 to move around the longitudinal axis X in the direction of the arrow ROT. The speed of the movement is initially low and increases with the flow of water along the blade 24.

The angle between the outer edge of the blade 24, next to the outer ring 22, and the median plane M is called high-angle $\theta 1$, and the angle between the inner edge of the blade 24, compared to the inner ring 20, and the median plane M is called low angle $\theta 2$. A twist of blade 24 corresponds to a difference between the value of the high angle $\theta 1$ and that of the low angle $\theta 2$.

Twisting of the blade 24, the top angle $\theta 1$ and the low angle $\theta 2$ decreases with increasing rotational speed of the rotor 14. The blade 24 starts to deviate from the initial high stop 50A and the low stop 52A, while the rotational speed continues to increase.

When the rotation speed has its nominal value, the twist of the blade 24 is relatively low, and the blade 24 is away from first upper stop 50A and lower stop 52A.

The hydrokinetic device 10 according to the invention operates similarly following both the directions S1, S2 of the current, each blade 24 is sufficiently flexible, by the curvilinear length L2 of the thin part 48 so that the first side 36 corresponds to the upper surface EXT in the first direction S1 of the current (FIG. 4) and the intrados INT in the second direction S2 of flow (FIG. 5).

When the water flow is oriented in the second direction S2, the blade 24 is then stopped against the second upper stop 50B and lower stop 52B at low rotational speeds of the rotor 14 as shown in FIG. 5.

In the same manner as to what has been described above with reference to FIG. 4 for the first direction of the current S1, when the rotational speed of the rotor 14 increases, each blade 24 separates off slowly and gradually from the second upper stop 50B and the lower stop 52B and the twist of each blade 24 decreases.

When the rotor 14 has its rated speed, each blade 24 is away from second upper stop 50B and lower stop 52B, and the twist of each blade 24 is low.

The inclination of the blades 24 with respect to a plane perpendicular to the longitudinal axis X has a variable value. The inclination of each blade 24 is automatically adapted to the flow of water along the blade 24 and the rotational speed of the rotor 14, each blade being rotatable about its axis radial 26. The limiting means 28 can prevent positioning as per a longitudinal plane parallel to the longitudinal axis X of each blade 24 in order to maintain a minimum bearing strength of the water flow on each blade 24.

The Project Manager will note that the direction of rotation of rotor 14 (arrow ROT) is same whatever is the direction of the current S1, S2 along the longitudinal direction X, which facilitates the operation of hydrokinetic device 10 according to the invention. Indeed, with the tidal current, a change of direction of the water flow results in a reversal of the direction of rotation of the rotor. This reversal of the direction of rotation is slowed by the inertia of the rotor, making it difficult to fully exploit the hydrokinetic device, for the time lost in changing the direction of rotation.

It can thus be seen that the rotor 14 according to the invention performs better on the whole range of rotational speeds, such as rotor speeds between 0 and 50 revolutions/minute, regardless of the direction of flow.

Figure 6:
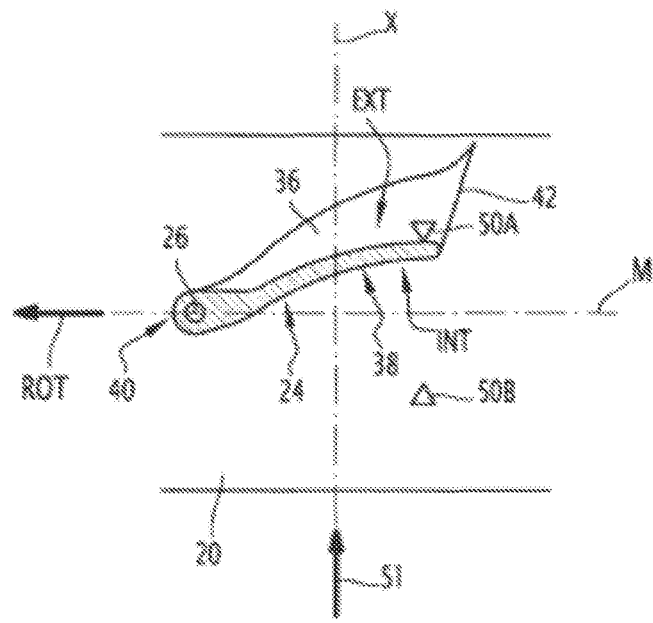
FIG. 6 is a view similar to that of FIG. 4 according to a second embodiment of the invention.
Figure 7:
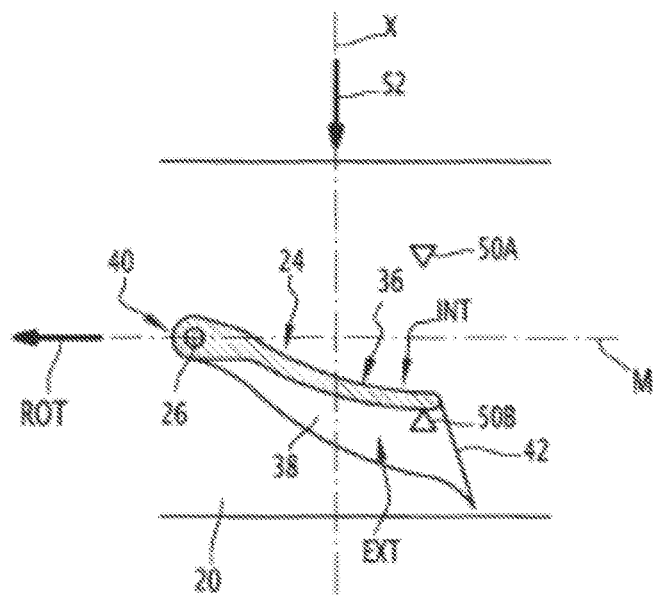
FIG. 7 is a view similar to that of FIG. 5 according to a second embodiment of the invention.

FIGS. 6 and 7 illustrate a second embodiment of the invention wherein elements similar to the first embodiment described above are identified by identical reference numbers and are not described again.

According to the second embodiment, the limiting means 28 comprise, for each movable blade 24 around its radial axis 26, only the first upper stop 50A and the second lower stop 50B arranged on the outer ring 22, in the absence of lower stop arranged on the inner ring 20.

The maximum value of the high $\theta 1max$ between the rest position of the blade 24 and a stop position of the blade 24 against the first upper stop 50A respectively and the second upper stop 50B is between 10° and 30°, preferably equal to 20°.

The functioning of this second embodiment is similar to the first embodiment, whether it is the first direction of the current S1 (FIG. 6) or the second direction of the current S2 (FIG. 7), and is not described again.

According to this second embodiment, the limiting means 28 comprise of a lower number of stops 50A, 50B, which reduces the costs. Other advantages of this second embodiment are similar to those of the first embodiment, and are not described again.

In a third embodiment, not shown, the limiting means 28 comprises, for each movable blade 24 around its radial axis 26, of only the first lower stop 52A and the second lower stop 52B arranged on the inner ring 20, in the absence of upper stop arranged on the outer ring 22.

According to the third embodiment, the maximum value $\theta 2max$ between the rest position and a stop position of the blade 24 against the respective lower stop 52A, 52B is between 30° and 60°, preferably equal at 45°.

The inclination of the blades 24 with respect to a plane perpendicular to the longitudinal axis X also has a variable value, and automatically adapts to the water flow rate and the rotor, each blade being rotatable around its radial axis 26, the limiting means 28 to prevent a positioning along a longitudinal plane X parallel to the longitudinal axis 24 of each blade.

It can thus be seen that the rotor 14 according to the invention performs better on the whole range of rotational speeds, such as rotor speeds between 0 and 50 revolutions/minute, regardless of the direction of flow.

The invention claimed is:

1. A rotor adapted to be rotated by a flow of a liquid, the rotor comprising:
   an inner ring;
   an outer ring centered on a same longitudinal axis as the inner ring, wherein at least one radial axis extends radially between the inner ring and the outer ring;
   at least one blade extending between the inner ring and the outer ring in a radial direction, wherein the at least one blade is movable around the at least one radial axis, the at least one blade having a rest position in the absence of a current;
   a plurality of stops arranged on the outer ring and the inner ring, each of the outer ring and the inner ring having at least one stop of the plurality of stops, the plurality of stops limiting rotational movement of the at least one blade around the at least one radial axis;
   wherein the plurality of stops comprises a lower stop arranged on the inner ring, and a first angle between the rest position of the blade and a stop position of the blade against the lower stop is between 30° and 60°; and
   wherein the plurality of stops comprises an upper stop arranged on the outer ring, and second angle between the rest position and a stop position of the blade against the upper stop is between 10° and 30°;

wherein the first angle and the second angle are different angles.

2. The rotor according to claim 1, wherein the plurality of stops comprises a first stop and a second stop arranged on at least one of the inner ring and the outer ring, the first stop being associated to a first direction of a current with respect to the rotor and the second stop being associated to a second direction of the current with respect to the rotor.

3. The rotor according to claim 1, wherein the plurality of stops comprises a first upper stop and a second upper stop arranged on the outer ring, a first lower stop and a second lower stop arranged on the inner ring, the first upper and lower stops being associated with the first direction of the current and the second upper and lower stops being associated with the second direction of the current.

4. The rotor according to claim 1, wherein the rotor comprises of, for each blade, a radial axis extending radially between the inner ring and the outer ring, each blade is movable around the radial axis, and the plurality of stops are adapted to limit the rotational movement of each blade.

5. The rotor according to claim 1, wherein the rotor comprises of N blades, where N is between 2 and 20.

6. The rotor according to claim 1, wherein the blade or each blade has an upper surface, a lower surface, a leading edge and a trailing edge, the leading edge being the edge of the blade extending in the radial direction and disposed upstream in the direction of the liquid flow along the blade, trailing edge being the edge opposite to the leading edge and disposed downstream in the direction of flow of liquid along the blade, wherein at least one portion of at least one blade has a cross section as per a plane perpendicular to the radial direction, a profile having a relatively thick portion and a relatively thin portion, each having a maximum thickness according to a direction perpendicular to the upper surface, the maximum thickness of the thick portion is at least four times greater than the maximum thickness of the thin portion, and wherein a curvilinear length of the thin part is between 0.25 times a length of a chord between the leading edge and the trailing edge and 0.9 times the length of said chord.

7. A device consisting of a rotor and a stator, the rotor structured according to claim 1.

* * * * *